(12) United States Patent
Fouarge

(10) Patent No.: US 8,034,297 B2
(45) Date of Patent: Oct. 11, 2011

(54) TRANSFER PIPE BETWEEN LOOP REACTORS

(75) Inventor: Louis Fouarge, Dilbeek (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 246 days.

(21) Appl. No.: 12/280,616

(22) PCT Filed: Feb. 21, 2007

(86) PCT No.: PCT/EP2007/051660
§ 371 (c)(1),
(2), (4) Date: May 20, 2009

(87) PCT Pub. No.: WO2007/096381
PCT Pub. Date: Aug. 30, 2007

(65) Prior Publication Data
US 2010/0008829 A1    Jan. 14, 2010

(30) Foreign Application Priority Data
Feb. 27, 2006  (EP) .................................... 06110436

(51) Int. Cl.
*B01J 19/18*  (2006.01)
*G05D 7/00*  (2006.01)
*G05D 16/00*  (2006.01)

(52) U.S. Cl. .......................... 422/132; 422/111; 422/112
(58) Field of Classification Search .................. 422/132, 422/111, 112
See application file for complete search history.

(56) References Cited

U.S. PATENT DOCUMENTS

| 6,562,914 B1 | 5/2003 | Andtsjo et al. |
| 7,851,566 B2 | 12/2010 | Damme |
| 2005/0272891 A1 | 12/2005 | Fouarge et al. |

FOREIGN PATENT DOCUMENTS

| EP | 1410843 A1 | | 4/2004 |
| EP | 1563899 A1 | | 8/2005 |
| EP | 1611948 | * | 1/2006 |
| EP | 1611948 A | | 1/2006 |
| WO | 03070365 A1 | | 8/2003 |

* cited by examiner

*Primary Examiner* — Walter D Griffin
*Assistant Examiner* — Lessanework Seifu

(57) ABSTRACT

The present invention discloses a transfer system between the first and second reactors in a double loop reactor that is equipped to reduce clogging in the transfer lines by providing a regulation mechanism arranged to insure equivalent flushing in each transfer line.

5 Claims, 2 Drawing Sheets

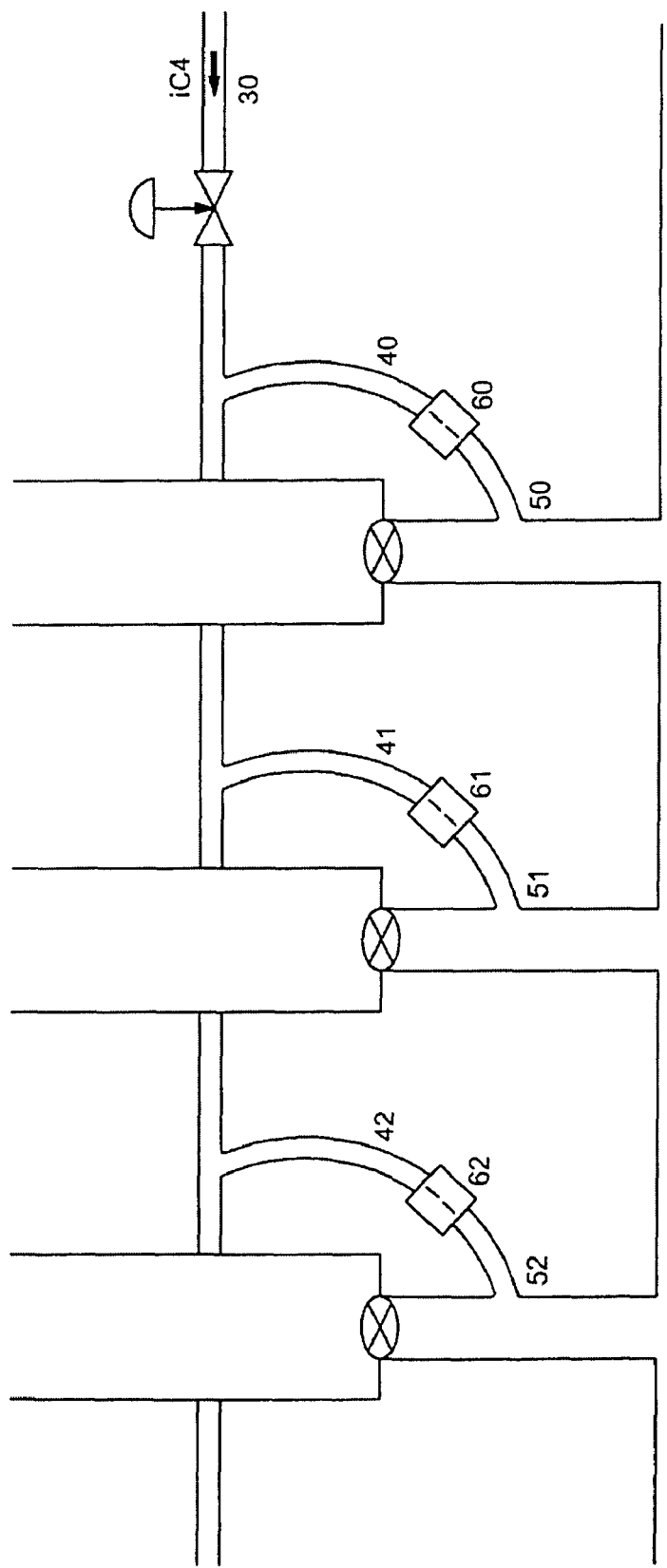
"Figure 2"

TRANSFER PIPE BETWEEN LOOP REACTORS

This application claims the benefit of International Application No. PCT/EP2007/051660, filed Feb. 21, 2007, which claims the benefit of European Pat. Appl. Ser. No. EP06110346.0, filed Feb. 27, 2006.

This invention is related to the field of olefin polymerisation in double loop reactors and especially to the polymerization of olefins with very active catalyst systems.

High density polyethylene (HDPE) was first produced by addition polymerisation carried out in a liquid that was a solvent for the resulting polymer. That method was rapidly replaced by polymerisation under slurry conditions according to Ziegler or Phillips. More specifically slurry polymerisation was carried out continuously in a pipe loop reactor. A polymerisation effluent was formed which is a slurry of particulate polymer solids suspended in a liquid medium, ordinarily the reaction diluent and unreacted monomer (see for Example U.S. Pat. No. 2,285,721). It is desirable to separate the polymer and the liquid medium comprising an inert diluent and unreacted monomers without exposing the liquid medium to contamination so that said liquid medium can be recycled to the polymerisation zone with minimal or no purification. As described in U.S. Pat. No. 3,152,872, a slurry of polymer and the liquid medium is collected in one or more settling legs of the slurry loop reactor from which the slurry is periodically discharged to a flash chamber thus operating in a batch-wise manner. The mixture is flashed in order to remove the liquid medium from the polymer. It is afterwards necessary to recompress the vaporised polymerisation diluent to condense it to a liquid form prior to recycling it as liquid diluent to the polymerisation zone after purification if necessary.

Settling legs are typically required to increase the polymer concentration in the slurry extracted from the reactor; they present however several problems as they impose a batch technique onto a continuous process.

EP-A-0,891,990 and U.S. Pat. No. 6,204,344 disclose two methods for decreasing the discontinuous behaviour of the reactor and by the same occasion for increasing the solids concentration. One method consists in replacing the discontinuous operation of the settling legs by a continuous retrieval of enriched slurry. Another method consists in using a more aggressive circulation pump.

More recently, EP-A-1410843 has disclosed a slurry loop reactor comprising on one of the loops a by-pass line connecting two points of the same loop by an alternate route having a different transit time than that of the main route for improving the homogeneity of the circulating slurry.

The double loop systems are quite desirable as they offer the possibility to prepare highly tailored polyolefins by providing different polymerising conditions in each reactor. Polymer product is transferred from the first to the second loop through one or several transfer line(s). It is however often difficult to find suitable space to build these double loop reactors as in the current configuration they need to be close to one another in order to insure adequate transfer of growing polymer from one loop to the other. In practical situation, the transfer lines are on the contrary generally quite long and the average velocity of the material circulating in those lines is of less than 1 m/s. When a very active catalyst system, such as for example a metallocene catalyst systems, is used in the double loop reactor, the length of the transfer line becomes an issue. Because of the high reactivity of the very active catalyst systems, there is a risk of polymerisation in the transfer line and thus of clogging. These lines must therefore be very short in order to avoid clogging due to the on-going polymerisation of residual monomers.

There is thus a need to provide means to connect two existing reactors that may be distant from one another and to insure a smooth operation of polymer product transfer from the first to the second reactor.

It is an aim of the present invention to connect two distant loop reactors.

It is another aim of the present invention to reduce blockage or clogging in the transfer lines between two loop reactors.

At least one of these aims is achieved, at least partly, with the present invention.

LIST OF FIGURES

FIG. 2 represents the regulation system set up to generate equivalent flushing in each transfer line.

Figure 1:
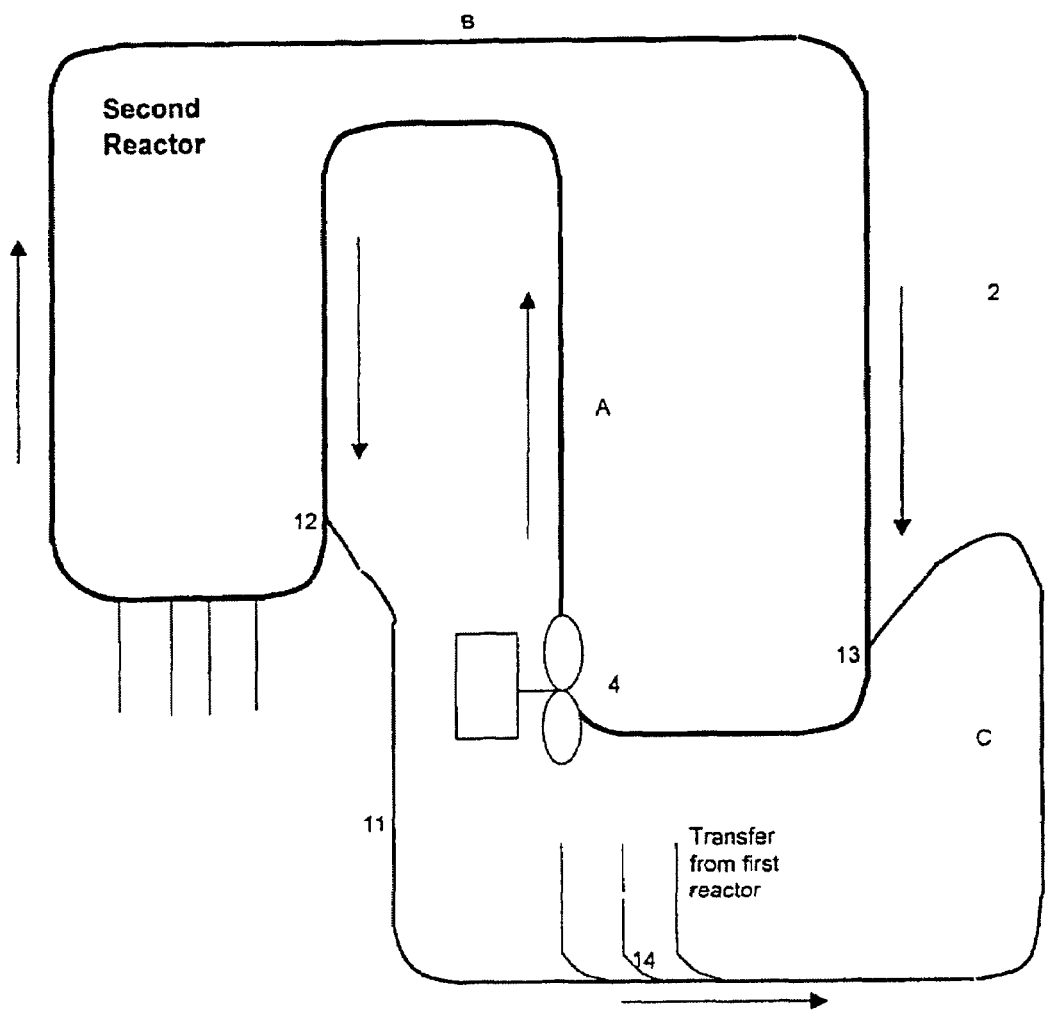
FIG. 1 represents a double loop reactor configuration of the present invention wherein the transfer line from the first to the second loop reactor is connected to the by-pass line linking two points of the second reactor.

Accordingly, the present invention provides a transfer system that is represented in FIG. 1 and comprises:

- a by-pass line (11) on the second loop reactor (2) that has a length of about twice the distance between the two loop reactors in order to extend to the proximity of the first loop reactor;
- two or more transfer lines (14) that transfer the product from the first loop reactor into said by-pass line at a point nearest to said first loop reactor;
- a regulation mechanism that insures equivalent flushing in each transfer line.

The typical by-pass line set-up is described in EP-A-1542793: it connects two points of the same loop by an alternate route having a different transit time than that of the main route. The slurry loop reactor, so modified, provides improved mixing within the reactor.

Throughout the present description the loops forming the slurry loop reactor are in series and additionally, each loop can be folded.

The regulation mechanism insuring equivalent flushing in each transfer line is represented in FIG. 2.

The regulation mechanism comprises:

- a main flushing line (30) carrying isobutane and connecting all transfer lines and equipped with a rotometer;
- secondary flushing lines (40, 41, 42) each connecting the main flushing line to one transfer line (50, 51, 52);
- in each secondary flushing line, a control mechanism (60, 61, 62) operated by difference between up-flow isobutane pressure and down-flow transfer line pressure.

In a preferred embodiment according to the present invention the control mechanism consists of an orifice plate placed perpendicular to the axis of the secondary flushing line.

Typically, the by-pass line carries a fraction of the slurry of from 0.5 to 50% of the total flow rate, preferably of 1 to 15% of the total flow rate. The flow time through the by-pass line is different from the time necessary to travel through the main loop as the routes have different lengths. This difference in travel time results in longitudinal mixing that improves the homogeneity of the slurry within the reactor.

Preferably, the entry point into the by-pass line is located up-flow of the exit point in order to benefit from the pressure difference between these two points and thereby to produce a natural acceleration.

Preferably, the slurry is re-injected to the main loop at an angle of from 1 to 90 degrees, preferably at an angle of from 30 to 60 degrees and more preferably at an angle of about 45 degrees.

The diameter of the by-pass is less than that of the main loop and the ratio DB/DL of the by-pass diameter DB to the loop diameter DL is of from 1:12 to 1:2, preferably of from 1:6 to 1:3.

Typically the diameter of the by-pass line is of from 12 cm to 30 cm. In addition the bends in the by-pass line are preferably long-radius bends: typically they have a radius of curvature that is equal to at least 10 times the diameter of the by-pass line. The typical slurry velocity within the by-pass line is above 10 m/s.

The by-pass line may be jacketed with cooling medium.

The distance between the two loops to be connected can be of up to 30 m, preferably of up to 20 m, more preferably of up to 15 m, when operated solely by the pressure difference between the entry point and the exit point of the by-pass line.

The transfer system of the present invention can be operated with any catalyst system known in the art but it is most advantageous for metallocene catalyst systems that are very active and thus can induce polymerisation within the transfer line thereby producing clogging of the line. It can be used for the homo- or co-polymerisation of olefins. Preferably, the olefin is ethylene or an alpha-olefin, more preferably ethylene or propylene, and most preferably ethylene. Co-polymerisation is obtained by adding a comonomer, preferably selected from C4 to C8 alpha-olefins, most preferably hexene.

In the present invention, the length of the by-pass line connected to the second reactor is increased with respect to the original set-up so that it passes close to the first reactor. The transfer line is dumped in the by-pass line appended to the second reactor instead of directly into the second reactor. In this set-up, the transfer line is much shorter than if it were directly connected to the second reactor.

Preferably, the product take-off from the first reactor is operated through one or more settling legs, each of which has a transfer line dumped into the by-pass line. Alternatively, several or all transfer lines may be joined into a common discharge before being connected to the by-pass.

The present invention produces the same advantages as those obtained with the by-pass line disclosed in EP-A-1410843:

The polymer products obtained with the by-pass-modified loop reactor have a bulk density that is from 1 to 5% larger than that of the polymer products obtained with the unmodified loop reactor;

The catalyst productivity is substantially improved without any loss in production. The catalyst productivity is typically increased by 10 to 50%. This improvement in catalyst productivity is obtained thanks to an increase of the residence time in the reactor and to the extension of the stable operation window. It has been observed that the solids content, measured as the ratio of the particle mass flow rate to the total mass flow rate, is increased by at least 1.5%, preferably by at least 3%.

In addition to these advantages procured by the by-pass in a single reactor, the transfer lines connecting the first reactor exit point to the by-pass line can be shortened. The risk of polymerising unreacted olefin emerging from the first reactor in these transfer lines is thus decreased. The concentration of olefin in the first reactor can be increased to a concentration of at least 6%, preferably of about 8%. The risk of blockage is further reduced by insuring equivalent flushing in all transfer lines.

EXAMPLES

Several transfer designs were evaluated. A schematic design of the transfer system is represented in FIG. 2. For all designs, the pressure drop between the entry point and the exit point of the by-pass line completely controlled the flow in the line.

The reactor parameters were as follows.

First Reactor volume: 19 m$^3$ number of settling leg: 3 internal diameter of settling legs: 19.37 cm (standard 8" pipe))

volume of settling legs: 30 liters each reactor internal diameter: 45.56 cm (standard 20" pipe)

polyethylene production: 6.5 tons/hr ethylene concentration: 6 wt % solids concentration: 42%

Second Reactor volume: 19 m$^3$ number of settling legs: 4 internal diameter of settling legs: 19.37 cm (standard 8" pipe)

volume of settling legs: 30 liters each reactor internal diameter: 45.56 cm (standard 20" pipe)

polyethylene production: 4.5 tons/hr ethylene concentration: 7 wt % solids concentration: 42%.

The parameters of the transfer system were selected as follows.

By-Pass Line.

angle at flow separation=33 degrees angle at flow reunion=45 degrees length of by-pass line=18 m internal diameter of by-pass line=14.64 cm (standard 6" pipe)

the by-pass line had 5 bends: 3 bends had an angle of 90 degrees, 1 bend had a deflection angle of 33 degrees and 1 bend had a deflection angle of 23 degrees.

At the exit of the first reactor, the polymer product was collected in three settling legs, each having a diameter of 19.37 cm (standard 8" pipe) and a volume of 30 L. Each settling leg was equipped with a rotational valve opening cyclically into a transfer line. The transfer lines had a diameter of 7.37 cm (standard 3" pipe) and a length of from 2 to 3 meters. A flushing of the transfer lines with isobutane was set to maintain a continuous minimum flow in the transfer lines All flushing lines, the main and secondary lines, had a diameter of 2.54 cm (1 inch) and were carrying a flow of isobutane. Each secondary flushing line was equipped with an orifice plate placed perpendicularly to the flow of isobutane and thus sensing up-flow the isobutane pressure and down-flow the transfer line pressure. Its role was to regulate and equate the flushing flow rates in all three transfer lines.

This system successfully suppressed clogging in the transfer lines.

The invention claimed is:

1. A transfer system between a first and second reactor in a double loop reactor comprising:
   a first loop reactor;
   a second loop reactor;
   a by-pass line on the second loop reactor comprising a length of least 1.5 times a distance between the first loop reactor and the second loop reactor adapted to extend a proximity of the first loop reactor;

two or more transfer lines arranged to transfer polymer product from the first loop reactor into the by-pass line at a point near the first loop reactor; and a regulation mechanism arranged to ensure equivalent flushing in each transfer line, wherein the regulation system comprises:

a main flushing line adapted to carry isobutene and connect all transfer lines, wherein the main flushing line is equipped with a rotameter;

secondary flushing lines, each connecting the main flushing line to a transfer line; and a control mechanism disposed in each secondary flushing line, wherein the control mechanism is operated by a difference between up-flow isobutane pressure and down-flow transfer line pressure.

2. The transfer system of claim 1, wherein the by-pass line on the second loop reactor has a length of least twice the distance between the two loop reactors.

3. The transfer system of claim 1, wherein the polymer product is collected in two or more settling legs before being dumped into the two or more transfer lines.

4. The transfer system of claim 1, wherein the two or more transfer lines are joined together before being connected to the by-pass line.

5. The transfer system of claim 1, wherein the control mechanism is an orifice plate placed perpendicular to flow lines in the secondary flushing lines.

* * * * *